United States Patent [19]
Klotz, Jr. et al.

[11] Patent Number: 5,682,540
[45] Date of Patent: Oct. 28, 1997

[54] SYSTEM FOR REPRESENTING ELECTRONIC FILES USING A PAPER BASED MEDIUM

[75] Inventors: Leigh L. Klotz, Jr., Palo Alto; Ramana B. Rao, San Francisco; Walter A. L. Johnson, Santa Clara; M. Margaret Withgott, Los Altos Hills, all of Calif.

[73] Assignee: Xerox Corporation, Stamford, Conn.

[21] Appl. No.: 352,327

[22] Filed: Dec. 8, 1994

Related U.S. Application Data

[63] Continuation of Ser. No. 52,088, Apr. 22, 1993, abandoned.

[51] Int. Cl.[6] .................................................. G06F 3/00
[52] U.S. Cl. ......................... 395/766; 358/448; 358/403
[58] Field of Search ............................. 395/144–149, 395/766, 788, 789; 364/419.02, 419.03; 235/494; 382/175, 305, 306; 358/403, 448

[56] References Cited

U.S. PATENT DOCUMENTS

| | | | |
|---|---|---|---|
| 3,632,995 | 1/1972 | Wilson | 235/494 |
| 3,699,518 | 10/1972 | Greenough et al. | 382/184 |
| 4,179,212 | 12/1979 | Lahr | 355/202 |
| 4,310,235 | 1/1982 | Lorenzo et al. | 399/84 |
| 4,476,381 | 10/1984 | Rubin | 235/375 |
| 4,588,211 | 5/1986 | Greene | 283/70 |
| 4,651,288 | 3/1987 | Zeising | 395/117 |
| 4,677,585 | 6/1987 | Ikegami et al. | 395/147 |
| 4,728,984 | 3/1988 | Daniele | 358/300 |
| 4,786,940 | 11/1988 | Daniele | 347/129 |
| 4,943,239 | 7/1990 | Koslin | 434/353 |
| 4,994,987 | 2/1991 | Baldwin | 434/305 |
| 5,046,005 | 9/1991 | Vilardebo et al. | 434/355 |
| 5,060,980 | 10/1991 | Johnson et al. | 283/70 |
| 5,140,139 | 8/1992 | Shepard | 235/456 |
| 5,168,371 | 12/1992 | Takayanagi | 358/296 |
| 5,184,003 | 2/1993 | McMillin et al. | 235/454 |
| 5,224,039 | 6/1993 | Cox et al. | 364/419.02 |
| 5,235,655 | 8/1993 | Hikawa | 382/317 |
| 5,237,394 | 8/1993 | Eaton | 356/402 |
| 5,274,468 | 12/1993 | Ojha | 358/448 |
| 5,291,592 | 3/1994 | Kita | 395/600 |
| 5,331,137 | 7/1994 | Swartz | 235/375 |
| 5,393,962 | 2/1995 | Konishi et al. | 235/375 |
| 5,465,167 | 11/1995 | Cooper et al. | 358/468 |
| 5,502,577 | 3/1996 | Mackinlay et al. | 358/468 |
| 5,506,697 | 4/1996 | Li et al. | 358/448 |
| 5,513,013 | 4/1996 | Kuo | 358/448 |

FOREIGN PATENT DOCUMENTS

| | | |
|---|---|---|
| 0 561 606 A1 | 9/1993 | European Pat. Off. |
| 143257 | 1/1992 | Japan |
| 92/07440 | 4/1992 | WIPO |

*Primary Examiner*—Heather R. Herndon
*Assistant Examiner*—Stephen Hong

[57] ABSTRACT

The present invention involves a novel form and methods for creating and using such forms. These forms are summaries (hereinafter "document surrogates") of associated objects, such as original documents, processes, or their copies, stored in a document processing system. A document surrogate made in accordance with the principles of the present invention comprises at least one sheet of a information storing substrate material that has a human readable area and a machine readable area. The human readable area may contain at least one area of material which summarizes the associated object. Such a summary may either be made manually by the user or created automatically by the document processing system. The machine readable area comprises a document reference code that is readable and recognizable by the document processing system. The code is located by the system and recognized from an image of the entire page. The reference code encodes an indicator to the storage location of the associated object. Upon encountering a document surrogate, the system may interpret the surrogate to be the equivalent of its associated object and uses the indicator to access the appropriate object. A mechanism may be provided to the system to either enable or disable this equivalence. If disabled, the system would treat the document surrogate like a typical page in a document.

40 Claims, 8 Drawing Sheets

SYSTEM FOR REPRESENTING ELECTRONIC FILES USING A PAPER BASED MEDIUM

This is a continuation of application Ser. No. 08/052,088, filed Apr. 22, 1993 now abandoned.

FIELD OF THE INVENTION

The present invention relates in general to the creation and use of document summary sheets and, in particular, to document summary sheets that have a machine readable code that indicate the associated document in a storage area.

BACKGROUND OF THE INVENTION

Prior to the advent of computer-based systems, paper was the primary medium of office communication. Reports were manually typed and filed away in filing cabinets. If duplicates were required, carbon paper copies were made. Interoffice communication was conducted primarily by way of written notes. These notes would merge with outside mail delivered by the Post Office in office "mail rooms" for subsequent distribution.

The introduction of copiers helped to automate some office work. For example, copiers obviated the need to manually type carbon copies to obtain copies of documents. This incremental increase in automation did not, however, diminish the reliance of paper as the primary medium of communication in the office. In fact, copiers made the wide distribution of documents easy; which, in turn, increased the volume of paper consumed in the office.

The nature of office work has changed considerably since the introduction of computer systems. Many office functions, such as wordprocessing, information management, form processing, and interoffice communications, have become streamlined due to the use of automated systems. Computer systems, in some cases, have succeeded in decreasing the amount of paper consumed in the office. For example, many interoffice communications occur on electronic mail systems. Unwanted communications may then be written and disposed of without the use of paper.

With the increasing use of electronic media, the demise of paper as a communication medium seemed plausible. However, the promise of the "paperless" office has not yet come to pass. This fact underlies the basic truth that both paper and electronic media have opposite strengths and weaknesses as communication media.

Among its disadvantages, paper is, in some respects, inflexible. For example, inscriptions written on paper are fixed and cannot be moved around. Additionally, paper is passive. Words cannot be automatically rearranged within paragraphs nor can misspellings be automatically detected and corrected. Large, paper documents are cumbersome and difficult to transport, as compared to files stored and transported on a floppy disk or transmitted electronically. These qualities are exactly the strengths that electronic media possess.

Among its advantages, paper is relatively cheap to manufacture, as compared with the computer systems needed to replace it. Paper is also easy to use. Putting pen to paper does not require any specialized knowledge beyond the penmanship skills taught at a very early age. A person using paper need only be concerned with the task at hand. By contrast, a person performing wordprocessing, for example, requires some knowledge about the operating system and specific application software. Such knowledge is not directly related to the immediate task. These advantages make it unlikely that paper will be completely replaced by electronic media.

Currently, there is interest in combining the relative strengths of paper and electronic media for the purposes of creating a more integrated medium. The fundamental idea is to allow paper to be used as an active interface into an electronic system. In one such application, paper forms are marked by the user in the usual fashion with pen or pencil. Those forms are subsequently scanned by the system. The scanned image can then be interpreted by the system as data, machine instructions, or other information. Such a system is disclosed in U.S. Pat. No. 5,060,980 issued to Johnson et al. on Oct. 29, 1991 and assigned to Xerox Corporation. This patent is hereby incorporated by reference into the present application.

This system, however, does not address the problem of reducing the amount of paper still being used in today's offices. In fact, far from eliminating paper, electronic media can add to the amount of paper generated in the office place. "Junk" faxes and mail generated from computer data bases clog mail rooms. Wordprocessors and copiers allow users to quickly and easily generate multiple copies of reports and notes. As a result, the potential exists for offices and users of these systems to drown in a sea of paper. Thus, a need has arisen to control and manage this "paper blizzard".

One way of reducing paper usage has been to summarize lengthy, original documents. With a summary, users may decide whether they want to see the original document or not without having to print its entirety. Summaries have been in common use for some time. Prior to the advent of automated systems, individuals read documents and summarized their contents.

Since then, various methods of automatically generating summaries have become known in the art. Today, artificially intelligent programs exist which extract and summarize semantic meanings from stored text files. These programs may also be used as back-end processes to optical character recognition systems that discern text from a scanned image.

Further, novel methods have been described that discern semantic and other kinds of meanings from document images without the necessity for decoding the image to text characters. These methods are described in several copending and cross-referenced U.S. patent applications, all filed on Nov. 19, 1991 and assigned to Xerox Corporation. These applications are U.S. patent application Ser. Nos. 07/794,543; 07/794,555; 07/795,419 and 07/794,191 to Withgott et al.; 07/795,174 to Huttenlocher et al.; and 07/794,190 to Bloomberg et al. These applications are hereby incorporated by reference into the present application.

Summaries and methods for creating them, however, fail to address the need to bridge the gap between the paper world and the electronic world. In short, these summaries are useful only to human users. It would be desirable to combine the strengths of both paper and electronic media to create a system that decreases the amount of paper generated while, simultaneously, allowing the user to use paper as an active interface into electronic media. One way of achieving this goal would be to create document surrogates that may incorporate summaries that are as useful to automated systems as they are to humans.

Therefore, it is an object of the present invention to provide a novel form and a method of creating and using such a form that may reduce the amount of paper generated by automated systems used in the ordinary course of business.

3

It is further an object of the present invention to allow this novel form to be read and interpreted by the electronic system; thereby, providing additional integration between paper media and electronic media.

SUMMARY OF THE INVENTION

In summary, the present invention involves a novel form and methods for creating and using such forms. These forms are surrogates of associated objects such as original document, processes, or their copies, stored in a document processing system. A document surrogate made in accordance with the principles of the present invention comprises at least one sheet of a information storing substrate material (commonly paper) that has a human readable area and a machine readable area. The human readable area may contain at least one area of material which summarizes the original document. This human usable summary may either be made manually by the user or created automatically by the document processing system or may be left blank according to the needs of the user.

The machine readable area comprises a document reference code that is readable and recognizable by the document processing system. The code is located and recognized from the image of the surrogate. The reference code encodes an indicator to its associated object. Upon encountering a document surrogate, the system interprets the surrogate to be the equivalent of its associated object and uses the indicator to access the appropriate object. A mechanism may be provided to the system to disable this equivalence. If disabled, the system would treat the document surrogate like a typical page in a document. Alternatively, the system could normally recognize and process a document surrogate as a typical page unless the equivalence was enabled.

One advantage of the present invention is that the user can condense a large document into a one page surrogate which can be physically or electronically stored or distributed in lieu of the original document.

Another advantage of the present invention is that the document surrogate may provide the user with a sufficient memory jog to allow the user to decide whether the information the user desires is contained within the original document.

Another advantage of the present invention is that the document surrogate is an integral part of a larger paper-based user interface because the document surrogate can be recognized as the symbolic equivalent of an original document stored in a document processing system.

Another advantage of the present invention is that the amount of paper used by such a system is decreased. As one example, a document surrogate can be automatically generated by the document processing system in response to an incoming facsimile message. A user may decide to discard any unwanted fax messages without having to print out the entire fax message. Another way to reduce paper usage is by distributing document surrogates among users instead of documents. Users may then decide whether they would like the original document in its entirety.

Another advantage of the present invention is portability. For example, a user need only carry document surrogates, instead of entire documents, to a remote location. The document surrogates can then be scanned and transmitted to the document processing system via a remote facsimile transmission or other transmission means. The document processing system may locate and transmit the original document from the machine readable indicator provided in the document surrogate.

4

Another advantage of the present invention is that a sheet of paper can be used to provide a catalog listing of multiple documents stored in the document processing system.

Additional objects and features of the present invention will be more readily apparent from the following detailed description of an exemplary embodiment thereof, as illustrated in the accompanying drawings.

BRIEF DESCRIPTION OF THE DRAWINGS

The purpose and advantages of the present invention will be apparent to those skilled in the art from the following detailed description in conjunction with the drawings.

DETAILED DESCRIPTION OF THE PREFERRED EMBODIMENTS

The following description is presented to enable any person skilled in the art to make and use the invention, and is provided in the context of a particular application and its requirements. Various modifications to the preferred embodiment will be readily apparent to those skilled in the art, and the generic principles defined herein may be applied to other embodiments and applications without departing from the spirit and scope of the present invention as defined by the appended claims. Thus, the present invention is not intended to be limited to the embodiment shown, but is to be accorded the widest scope consistent with the principles and features disclosed herein.

Figure 1:
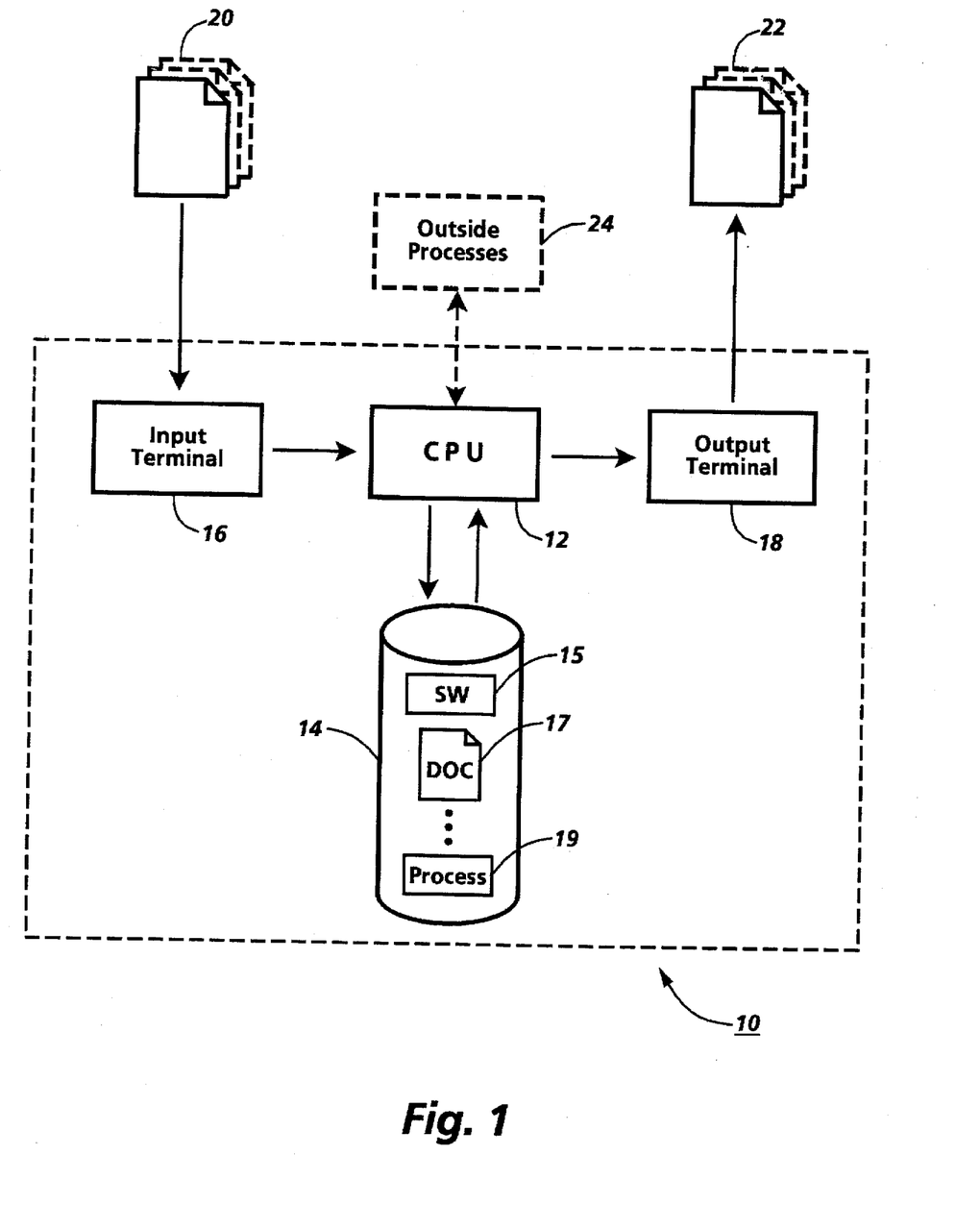
FIG. 1 is a high level block diagram of a document processing system that reads and recognizes document surrogates.

Referring to FIG. 1, document processing system 10 which can read and recognize document surrogates is depicted. System 10 comprises both hardware and software components. The hardware components comprising system 10 are central processing unit (CPU) 12, storage area 14, input terminal 16, and output terminal 18. Input terminal 16 is generically labeled and encompasses a wide variety of such devices. These input devices include copiers, fax scanners, optical character recognition scanners (OCR), bar scanners, and the like, as well as network and telephone communication ports. Similarly, output terminal 18 is generically labeled and may include printers, screen displays, fax terminals, network and telephone communication ports and the like. It will be appreciated that input terminal 16 and output terminal 18 may be included in the same device in actual practice.

Likewise, storage area 14 is generic and may comprise RAM, ROM, CD-ROM, or other media of storage such as hard disk, magnetic tape, or the like. Other devices for accepting, capturing and storing data are well known and the above list should not be construed as exhaustive. Storage area 14 may contain stored document files, such as document file 17, system software 15, and processes 19 that generate documents resulting from their execution. System software 15 which controls CPU 12 may reside in either ROM, RAM, or other units of storage. It will also be appreciated that storage 14 may be a shared or distributed resource among many processors (not shown in FIG. 1) in a networked configuration.

Software sufficient to manage and interpret form images is described in both above mentioned U.S. Pat. No. 5,060, 980 and in pending U.S. patent application Ser. No. 07/530, 677 by Zdybel et al. filed on May 30, 1990 and assigned to Xerox Corporation. Zdybel et al is hereby incorporated by reference into the present application.

In a typical application, document 20 is scanned or otherwise entered by input terminal 16. It should be appreciated that various input formats, such as bitmap representation, compressed image format, and the like are well known in the art, and that the present invention should not be limited to any particular format.

It should be noted that the documents stored in storage 14 are not limited to image documents. In particular, it may additionally contain structured electronic document of such formats as page description language (PDL) documents, wordprocessor formats, document interchange formats, or the like. Such formats are well known in the art, and the present invention should not be limited to documents of any particular format.

CPU 12, under action from software 15, processes the image of document 20. System 10 acts on the image one page at a time as a natural block of data. The action taken varies according to whether CPU 12 regards the page as representing data, machine instruction, or other information. If the page is a data item, it may be stored in storage 14. If the document page is construed as machine instructions, CPU 12 will execute the corresponding instructions. How the system inputs and processes a document in the context of document surrogates will be discussed in greater detail below.

Figure 2A:
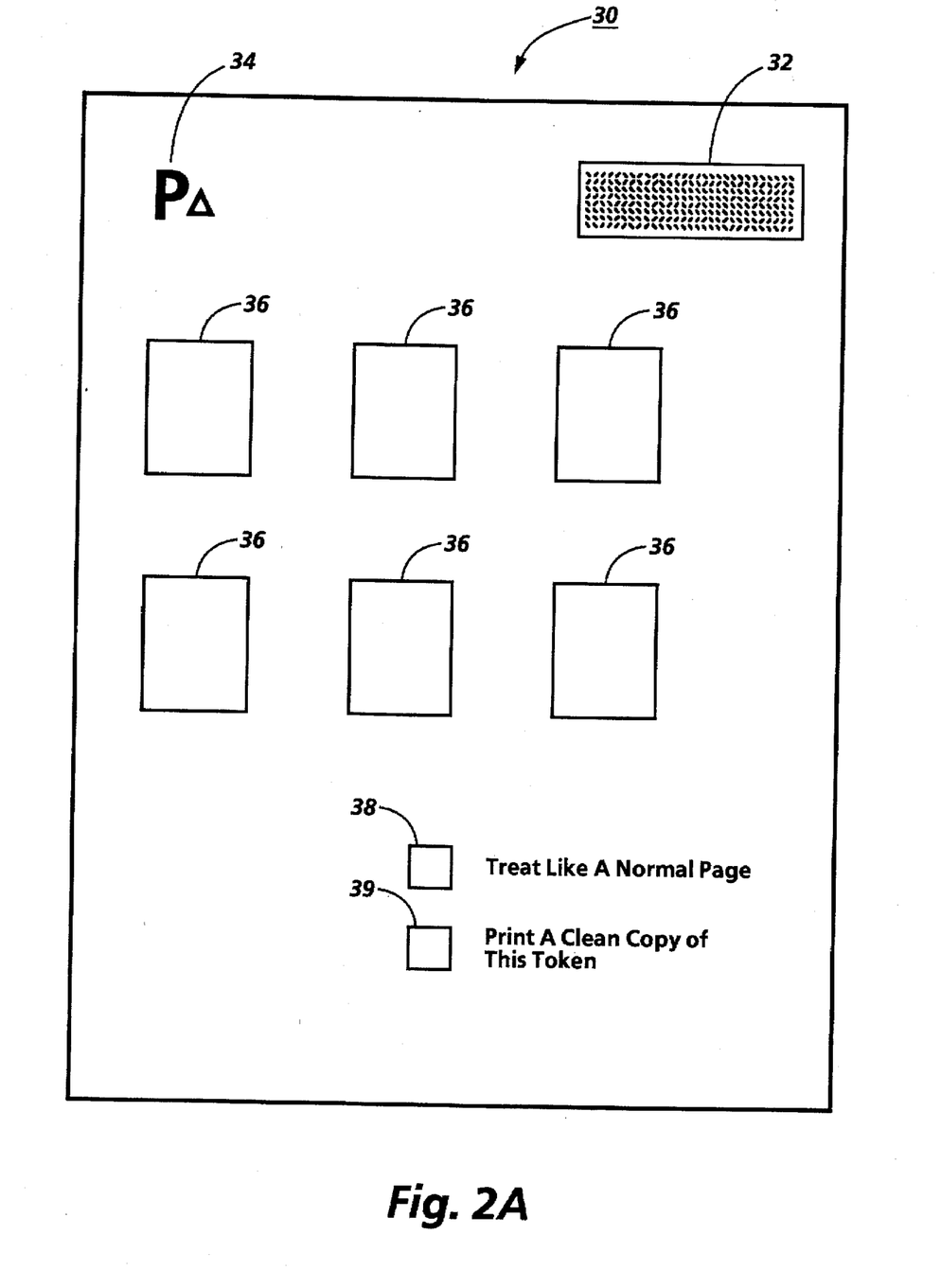
FIGS. 2A–2C are various preferred embodiments of document surrogates made in accordance with the principles of the present invention. The document surrogates vary according to the content and manner in which the human readable summaries are generated.
Figure 2B:
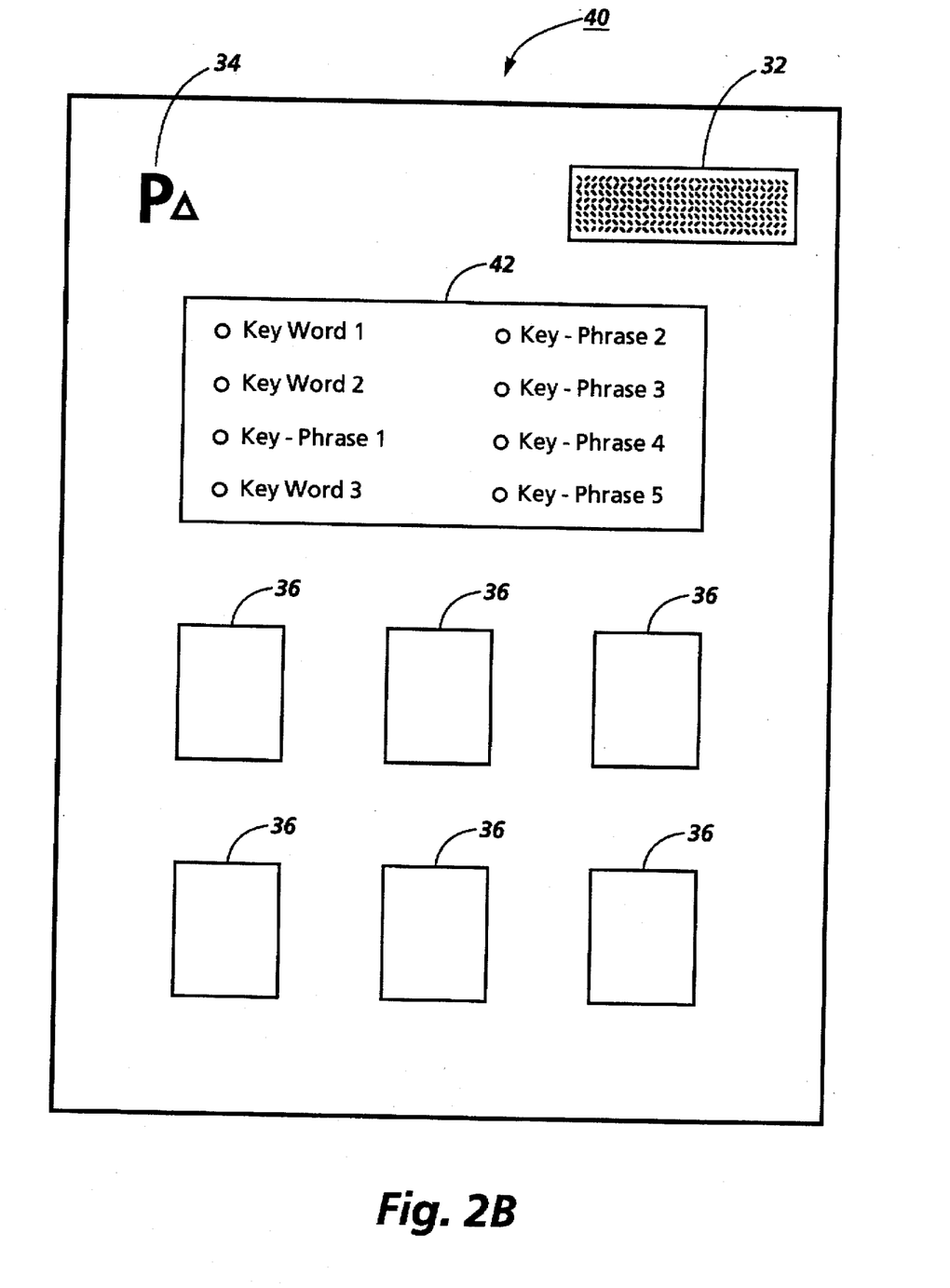
Figure 2C:
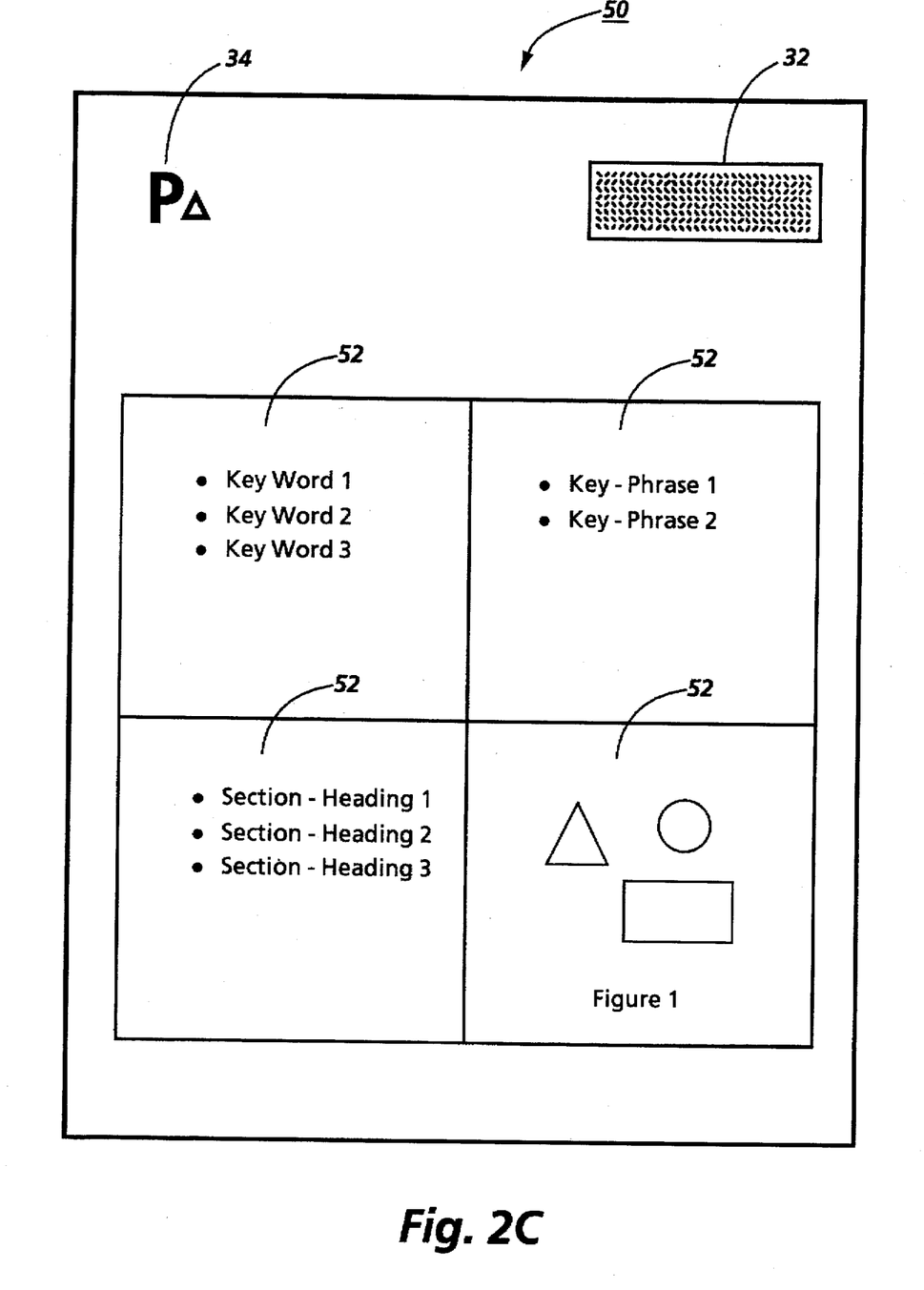

Having discussed the system that processes document surrogates, various features and aspects of document surrogates will now be discussed. FIGS. 2A–2C are exemplary embodiments of document surrogates constructed in accordance to the principles of the present invention. The main difference between these examples lies in the manner of creation and content of the human readable summaries of the original document. It should be appreciated that the summaries may be either user supplied or automatically generated or any combination thereof.

FIG. 2A shows a preferred embodiment of a document surrogate made in accordance with the principles of the present invention. Document surrogate 30 comprises a sheet of paper with a human readable summary showing reduced images 36 of the first six pages of the original document. Methods of producing reduced page images from full images are well known in the arts of image processing and xerography. The size of the reduction should ideally be such that the reduced image gives the reader of surrogate 30 a reasonable memory jog as to the identity of the full document.

The upper left hand corner of surrogate 30 contains marker 34. Marker 34 can be used by system 10 as a "flag" to distinguish the page as a document surrogate from ordinary pages. Marker 34 is optional in the sense that the other methods for "flagging" are available and are discussed below. It will be appreciated that the actual shape and location of marker 34 is arbitrary to the extent that the system is able to uniquely identify the page as a document surrogate.

The upper right hand corner of surrogate 30 contains machine readable code 32. Code 32 may encode various types of information about the form. For example, code 32 may encode the fact that this page is a document surrogate, thus acting as a second method of "flagging". This might be accomplished by including a data field in code 32. The data field might be a boolean or some multi-valued data item. If code 32 acts as a flag, marker 34 would be a redundancy and may be deleted.

Another way of embedding a "flag" in code 32 is by using an "indicator". An "indicator", in the present context, is a general way of pointing to some object. An indicator could be an address pointer to a real or virtual address. An indicator may also involve a look-up table or a hash function. An indicator, embedded in code 32, might point to a routine that would cause system 10 to treat the current page as a document surrogate. This routine might be kept in storage 14 or in any other storage area accessible to system 10. It will be understood that other ways of indicating are well known in the art and the present invention should not be limited to those disclosed herein. Additionally, it will be understood that other methods of "flagging" are well known in the art and that the present invention should not be similarly limited.

Other information may be embedded in code 32. For example, code 32 may also contain information about which type of human readable document summary is included on surrogate 30. It will be appreciated that the actual locations of the human and machine readable information is unimportant.

In the preferred embodiment, code 32 is encoded in the form of "glyphs". Glyphs are a manner of encoding data with a series of marks that slant either from top-left to bottom-right or from bottom-left to top-right. The actual method of encoding in glyph forms is disclosed in the Zdybel et al. patent application, which is incorporated by reference. Although the preferred embodiment employs glyph codes, it should be appreciated that many machine readable codes are well known in the art and that the present invention should not be limited by the manner of encoding.

In the presently preferred embodiment, document surrogates may be construed by system 10 in two possible ways. Document surrogates may be construed to be to be the equivalent of either original documents or results of accessible processes or copies of such documents or results. In either case, document surrogates are always construed as an equivalence of one of these "associated objects" unless this equivalence is specifically disabled. A separate "indicator", embedded in code 32, points to which associated object it is equivalent. Accessible processes which generate results may either be external to system 10, such as outside processes 24 or internal to system 10, such as stored processes 19, as shown in FIG. 1.

It is the associated object that system 10 then processes in lieu of the document surrogate. For example, a copy command on a document surrogate will cause system 10 to copy the associated object as opposed to the document surrogate. This separation of objects from functions is one advantage of document surrogates. The document surrogate itself does not specify what function needs to be performed on the associated object. Thus, processing may occur at a later time. This separation gives users greater flexibility in the paper based user interface. Associated objects may be appended to other objects and documents to form larger documents. The document processing system may then process this greater document at some time later.

When the preferred embodiment inputs a document, such as document 20 and encounters a document surrogate, the system will either retrieve the associated document or invoke the accessible process and append its results to either a stored document file or an output document, such as file 17 or document 22 respectively. Although the presently preferred default is to always equate document surrogates with their associated documents unless disabled, it will be appreciated that the system could be designed to ignore this equivalence unless enabled and that such a design choice should not be construed to be a limitation on the present invention.

As mentioned above, this default mode of always treating document surrogates as equivalent to associated documents or processes may be disabled. If disabled, system 10 will treat a document surrogate as if it were any other page of a document. Thus, a user may be able to obtain a copy of an individual document surrogate without receiving the entire document in its place.

There are several ways in which this default mode may be disabled. First, a document surrogate may contain a check box on the face of the surrogate. Check box 38 in FIG. 2A is exemplary. If, for example, the user places a check mark in box 38, system 10 will detect its presence. Depending on convention, either the presence or absence of a check mark may mean to disable the default. For example, a mark present in box 38 would be construed as a disable request. Thus, system 10, detecting a mark in box 38, would treat surrogate 30 as a regular page. It will be appreciated that the mark could be a physical mark made with pen or pencil or the like and the surrogate could then be scanned in as an image. Alternatively, the mark might be invisible to the naked eye; but detectable in some other spectrum. Such invisible marking systems are well known in the art.

Another override box 39 is shown in FIG. 2A. System 10, detecting a mark in box 39, would respond by distributing a clean, unmarked copy of this document surrogate. This feature is desirable because after a surrogate has been physically marked, it may no longer serve as a document surrogate unless the mark can be effectively erased. Box 39 enables the regeneration of document surrogates after the user's marks have disabled the current page as a document surrogate.

A second disable mechanism could be to allow the user to set the mode of the system directly—either by physically setting switches on a panel (not shown in FIG. 1) connected to system 10 or by setting parameters in the operating system software 15 through an interface (not shown in FIG. 1) connected to system 10. The aforementioned switches might toggle system 10 between a straight "copy" mode in which surrogates are input as ordinary pages, or a "document machine" mode where all surrogates equate to their original documents. It will be appreciated that methods to allow users to change software parameters are well known in the art.

A third disable mechanism might be accomplished by forms processing. For example, the user could input a page which the system regards as a form containing machine instructions. This form might instruct system 10 to disable the equivalence until another enable command is received. Alternatively, the form would might instruct system 10 to override document surrogate processing for a specific period of time, pages or documents. For example, the form could instruct system 10 to override for the next N surrogates or documents inputted, where N is some integer greater than zero. For the purposes of the present invention, this form may either precede or follow the documents to be inputted. Forms processing is disclosed in the above mentioned Johnson et al. patent and Zdybel et al. patent application, both incorporated by reference. It will be appreciated that other disable mechanisms are possible and the scope of the present invention should not be limited by the ones listed herein.

FIG. 2B depicts a second preferred embodiment of the present invention. Document surrogate 40 has a human readable summary which comprises several reduced page images 36 from the original document as well as keyword section 42. Keyword section 42 may include a list of commonly appearing words or phrases or it may contain section heading rifles. While keyword section 42 may be input directly by the user, it is possible that section 42 can be automatically generated directly from a stored document image. The methods for automatically summarizing documents from their images are disclosed in the aforementioned patent applications which are incorporated by reference herein.

FIG. 2C depicts a third preferred embodiment of the present invention. Document surrogate 50 is shown having four window display summaries 52 which may each contain a separate summary of the document. For example, the summaries may include reduced images of pages of the document, a list of keywords and phrases, the largest figure included in the document, a list of section headings, or key passages. The methods for automatically extracting keywords/phrases/passages, largest figures, and section headings are disclosed in the above mentioned patent application which are incorporated by reference. It will be appreciated that the particular number of windows disclosed in FIG. 2C are arbitrary and that any number will suffice as long as it remains recognizable to human users.

Figure 3:
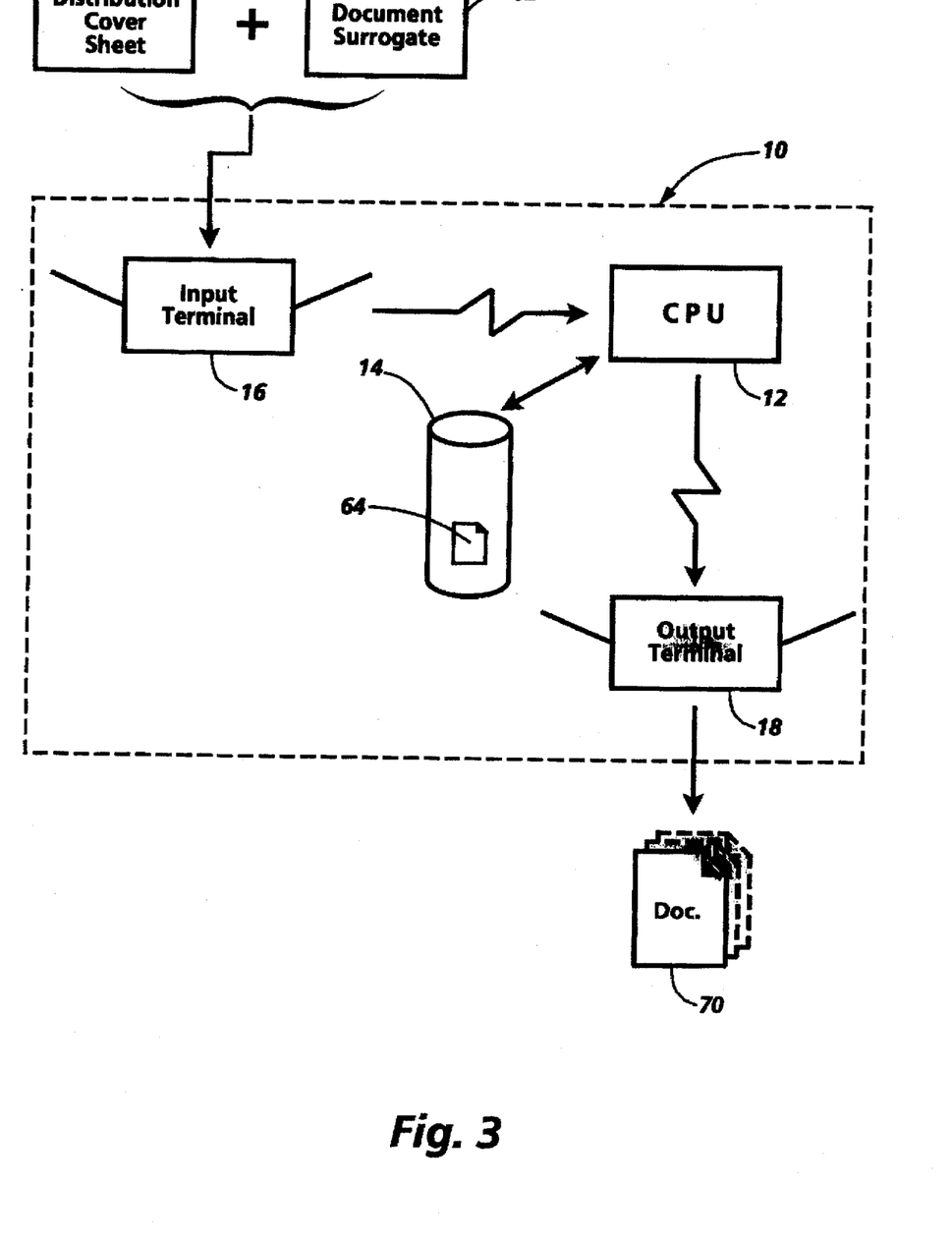
FIG. 3 depicts a typical use of document surrogates for the remote or local distribution of a document pointed by the document surrogate.

Referring now to FIG. 3, a exemplary use of the present invention is illustrated. This example demonstrates how document surrogates can be used to locally or remotely request distribution of the associated objects that they indicate. In the case of remote distribution, document surrogate 62 and distribution cover sheet 60 are input into input terminal 16. Distribution cover sheet 60 is a form containing machine instructions. The instructions cause document processing system 10 to distribute any documents following sheet 60 to any addresses specified in distribution sheet 60. As mentioned above, this method of forms processing is disclosed in both the Zdybel et al. patent application and U.S. Pat. No. 5,060,980.

Document processing system 10 scans document surrogate 62 and parses the machine readable code resident on the surrogate. A flag indicates that the sheet is a document surrogate to be processed accordingly. System 10 extracts the location of associated object 64 from the indicator embedded in the code found on surrogate 62. Document 70 is then remotely distributed as the hardcopy version of associated object 64 via facsimile transmission or any other means of distribution, as depicted as output terminal 18.

In the case of a local request for distribution of associated objects, the user need only supply document surrogate 62 without cover sheet 60. The distribution addresses might be supplied by some user interface, such as a panel on the front of system 10 (not shown). System 10, in response to a print command, copy command, fax command or the like, treats document surrogate 62 as the original document and will print, copy or fax document 70 unless system 10 is overridden. If system 10 is overridden, then system 10 will distribute a copy or print of the document surrogate.

The example in FIG. 3 demonstrates how the presently preferred embodiment would scan or otherwise input a document. The functionality of the document processing system is better summarized below in the following tables. It will be appreciated that the following description facilitates an understanding of the presently preferred system that would process document surrogates.

The presently preferred system is intended to work in the field of system reprographics. System reprographics is a well known field that applies digital electronics to photocopying, facsimile transmission, document printing, and the like. Reprographics applications are structured around the creation, processing, and printing of documents consisting of electronically represented document pages.

The presently preferred system comprises three levels of operations. The first and highest level are system applications. The system applications include document copying, document facsimile transmission, document facsimile reception, document storage, document retrieval, document printing, and the like. Table 1 lists description for document copying, document facsimile transmission, and networked document printing. It will be appreciated that any other applications are Written in a similar fashion and will be apparent to those skilled in the art.

TABLE 1

LEVEL 1 SYSTEM APPLICATIONS

APPLICATION 1: DOCUMENT COPYING

```
To Copy_A_Document [Number_of_Copies]
    Let Document = Scan_And_Store_Document
    Repeat Number_of_Copies [Print_Stored_Document(Document) ]
***Do not deleted stored Document, as is done in some SR implementations.
    Add_Attribute To Document "Copied at" (Date, Time)
    Let Document_Surrogate = Create_Document_Surrogate from
    Document
    Print_Stored_Document(Document_Surrogate)
    Deleted_Stored_Document(Document_Surrogate)
End
```

APPLICATION 2: DOCUMENT FACSIMILE TRANSMISSION

```
To Fax_A_Document [Fax_numbers]
    Let Document = Scan_And_Store_Document
    For each Fax_number in Fax_numbers [ Fax_Stored_Document
    (Document) to Fax_Number ]
***Do not deleted stored Document, as is done in some SR implementations.
    Add_Attribute To Document "Faxed To" (Fax_Numbers)"at"(Date,
        Time)
    Let Document_Surrogate1 = Create_Document_Surrogate from
    Document
    Print_Stored_Document(Document_Surrogate)
    Delete_Stored_Document(Document_Surrogate)
End
```

APPLICATION 3: NETWORKED DOCUMENT PRINTING

```
***This application accepts a structured electronic file describing a
***document, perhaps in a commercially available Page Description
***Language, and uses a separate facility to generate digital page
***images from the description.
***It then prints those pages, followed by a Document Surrogate.
To Print_Structured_Document [Structured_Document]
    Let Document = Decompose_PDL_Document from
        Structured_Document
    Print_Stored_Document(Document)
***Do not delete the Structured Document, as is done in some SR systems.
    Add_Attribute To Structured_Document
        "Printed from file"(Structured_Document)" at (Date, Time)
    Let Document_Surrogate = Create_Document_Surrogate from
        Structured_Document & Document
    Print_Stored_Document(Document_Surrogate)
    Deleted_Stored_Document(Document_Surrogate)
    Delete_Stored_Document(Document)
End
```

To implement the Level 1 applications, a second level of document specific operations are employed. Table 2 summarizes these Level 2 Document Operations.

TABLE 2

LEVEL 2 DOCUMENT OPERATIONS

OPERATION 1: SCAN AND STORE DOCUMENT

```
***Creates a new document consisting of all the pages in the document
***scanner, substituting for any Document Surrogates the pages of the
***Documents to which those Document Surrogates refer.
To Scan_and_Store Document[]
      Let Document = Create_Empty_Document
      Let Document_UID = Create_Unique_ID
      Add_Attribute To Document "Document UID ="(Document_UID)
      Loop Until Document_Feeder_Empty
         Let Page = Scan_Page
         If (Document Surrogate Processing is inhibited) or
            (Page is not a Document Surrogate)
         Then
            Add Page to Document
         Else ***Page is a Document Surrogate
            Let data = Read_Glyphs of Page
            Let ID = Parse_Document_Surrogate_Glyphs data
            Let Temp = Retrieve_Document with Document UID = ID
            For each Page in Temp do [Add Page to Document]
      End Loop
      Add_Attribute To Document "Scanned at"(Date, Time)
      Return Document
End
```

OPERATION 2-1: PRINT_STORED_DOCUMENT

```
***The following subroutine describes a method for printing
***stored image documents.
To Print_Stored_Document [Document]
      For each Page in Document [Print_Page (Page) ]
      Add_Attribute To Document "Printed from storage at"(Date, Time)
End
```

OPERATION 2-2: PRINT_STORED_DOCUMENT

```
***The following subroutine describes a method for printing
***stored structured documents, which is accomplished
***by Application Level 1.
To Print_Stored_Document [Structured_Document]
      Print_Structured_Document(Structured_Document)
End
```

OPERATION 3: DELETE_STORED_DOCUMENT

```
To Delete_Stored_Document [Document]
      For each Page in Document [Delete_Stored_Page (Page) ]
      Delete_Attributes (Document)
End
```

OPERATION 3: FAX_STORED_DOCUMENT

```
To Fax_Stored_Document [Document, To: Fax_Number]
      Let Connection = Connect_to_Fax_machine At (Fax_Number)
      For each Page in Document [Fax_Page (Page) using Connection ]
      Disconnect_Fax_Connection (Connection)
      Add_Attribute To Document "Faxed to" (Fax_Number) at (Date, Time)
End
```

OPERATION 4-1: CREATE_DOCUMENT_SURROGATE

```
***The following subroutines describe one simple method for
***creating Document Surrogates from Image documents:
To Create_Document_Surrogate [From: Document]
      Let This_Document_UID = Document_UID of Document
      Let Result = Create_Document_Surrogate_Internal
            From Document and This_Document_UID
      Return Result
End
```

OPERATION 4-2: CREATE_DOCUMENT_SURROGATE

```
***The following subroutines describe one simple method for
***creating Document Surrogates from Structured DOcuments for which
***an image document of some pages is available or can be generated.
To Create_Document_Surrogate [From:Structured_Document & Document]
   Let This_Document_UID = Document_UID of Structured_Document
   Let Result = Create_Document_Surrogate_Internal
```

TABLE 2-continued

LEVEL 2 DOCUMENT OPERATIONS

```
        From Document and This_Document_UID
    Return Result
End
OPERATION 4-3: CREATE_DOCUMENT_SURROGATE_INTERNAL

***The following subroutine is shared by the methods for
***creating document surrogates described above.
To Create_Document_Surrogate_Internal[From:Document,
    This_Document_UID]
    Let Document_Surrogate = Create_Empty_Document
***Create Docmuent Surrogate Page framework
    Let Surrogate_Page = Create_Blank_Page
    Place_Image Document_Surrogate_Mark on Surrogate_Page
    Place_Text"Document Surrogate" on Surrogate_Page
***Add the glyphs indicating the document surrogate correspondence.
    Let Glyph_Image = Create_Document_Surrogate_Glyphs
    incorporating This_Document_UID
    Place_Image Glyph_Image on Surrogate_Page
***Place the visual and verbal summary of the document on the page:
    For each Document_Page in [1,2,3,4,5,6]in Document[
        Place_Image    Reduced_Image_Of    Document_Page    on
        Surrogate_Page]
    For each Attribute in Attributes of Document[
        Place_Text Attribute on Surrogate_page]
***Return resulting Document Surrogate, stored as a document in the
document ***database.
    Add Surrogate_Page to Document_Surrogate
    Return Document_Surrogate
End
```

The third level of operations to implement the presently preferred system would be primitive operations. These primitives are low level functions which operate on particular hardware apparatus and parts of page data. As an example of hardware specific primitives, functions such as: "create empty document", "delete stored page", "create unique ID", and the like would be implemented for mass storage use. Fax primitives might include: "connect to fax machine", "disconnect", and "fax a page". Other primitives for hardware available to system 10 are similarly defined.

Additionally, primitive operations would be implemented to operate on document surrogates. For example, for reading a document surrogate, primitive operations might include: "test for whether page is not a document surrogate", "test for whether document surrogate processing is disabled", "parse document surrogate glyphs" and the like. For printing a document surrogate, primitive operations might include: "mark a document surrogate", "create document surrogate glyphs", and the like.

Figure 4:
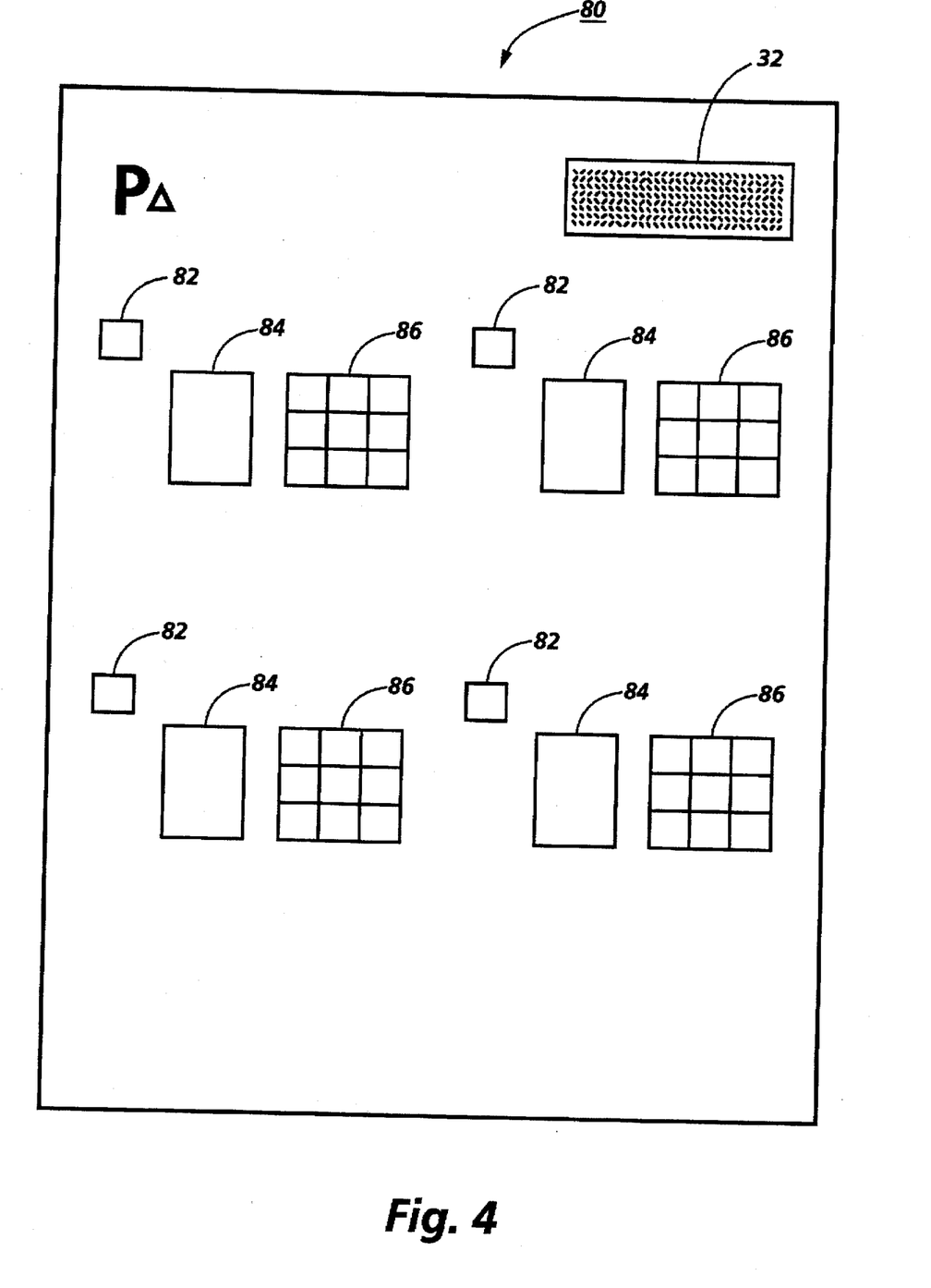
FIG. 4 depicts the use of the present invention as a document catalog.

Having discussed implementation details, additional advantages and features of document surrogates will now be discussed. For example, FIG. 4 shows a document surrogate that acts as a "document catalog". A document catalog is a document surrogate that contains summaries of more than one document. Document surrogate 80, as depicted, contains summaries of four different documents. Each document summary contains document selection box 82, first window 84, and second window 86. First window 84 may contain a summary of the document that is of primary importance or other information concerning the document. Second window 86 is depicted as a nine window summary of the document and may contain reduced images.

Selection box 82 is a way for a user to select a subset of documents that are summarized on the surrogate. The user need only place a check mark in each selection box 82 to make an appropriate selection. The document processing system will parse the machine readable code 32 for the existence of selection boxes affixed on the surrogate. The document processing system will then know to scan the image where selection boxes 82 are located and detect the presence or absence of user supplied selections. If the document processing system detects the presence of such a mark, the system knows to append the selected document to the new document the system is creating.

Figure 5:
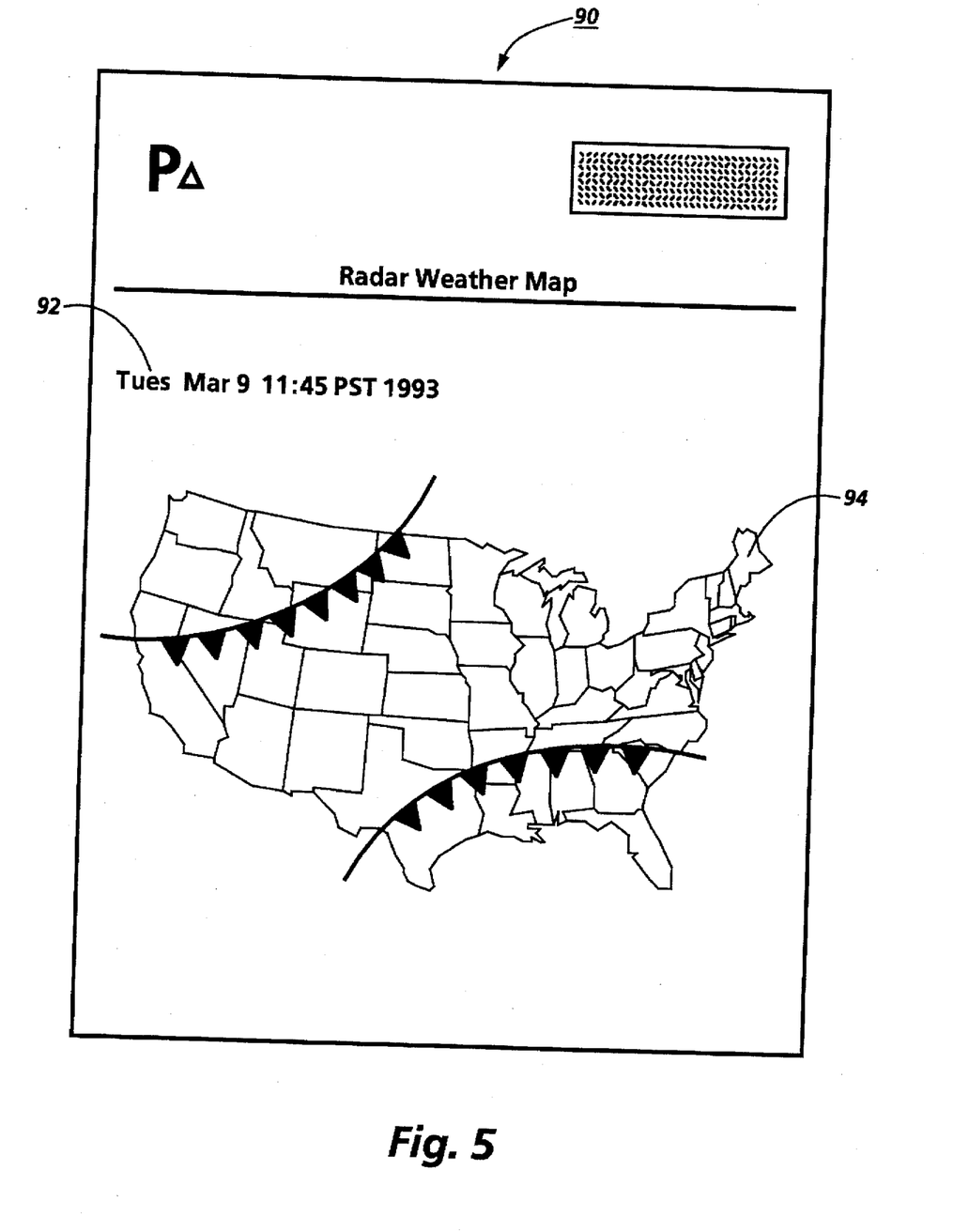
FIG. 5 depicts a document surrogate which points at a process as opposed to a static document stored in the document processing system.

FIG. 5 depicts another type of document surrogate that requires additional processing. As discussed above, document surrogates may have accessible processes as their associated object. These processes generate results which may be stored or distributed as documents. Document surrogates that associate with processes may require that either the system execute the process or wait for results of an independent execution prior to appending the results into a document. Document surrogate 90 shows a weather map of the United States at a particular time. Each time the document processing system encounters document surrogate 90, it may reference an updated version of the weather map instead of the particular time referenced in document surrogate 90. The conceptual difference is that document surrogate 90 points to a process that is accessible by the document processing system, instead of a static document located in its storage area. The result of parsing document surrogate 90 is that an updated map is appended to the new document that the system is creating. It will be appreciated that other processes accessible to the system are possible to summarize with document surrogates.

Another application of document surrogates involves individual pages of a document that contain a machine readable code. The code is essentially identical to that contained in regular document surrogates as described above. The main difference is that the flag in the page's code instructs the system to ignore the equivalence as the default of the system. This equivalence may be specifically enabled by use of a cover sheet or by some other mechanism which sets the default as described above. This usage permits the recreation and retrieval of a full document or any portion thereof from any of its pages so coded when the default is enabled. The advantage of having the default normally disabled is that pages so coded are ordinarily considered as pages by the system instead of the full document.

Figure 6:
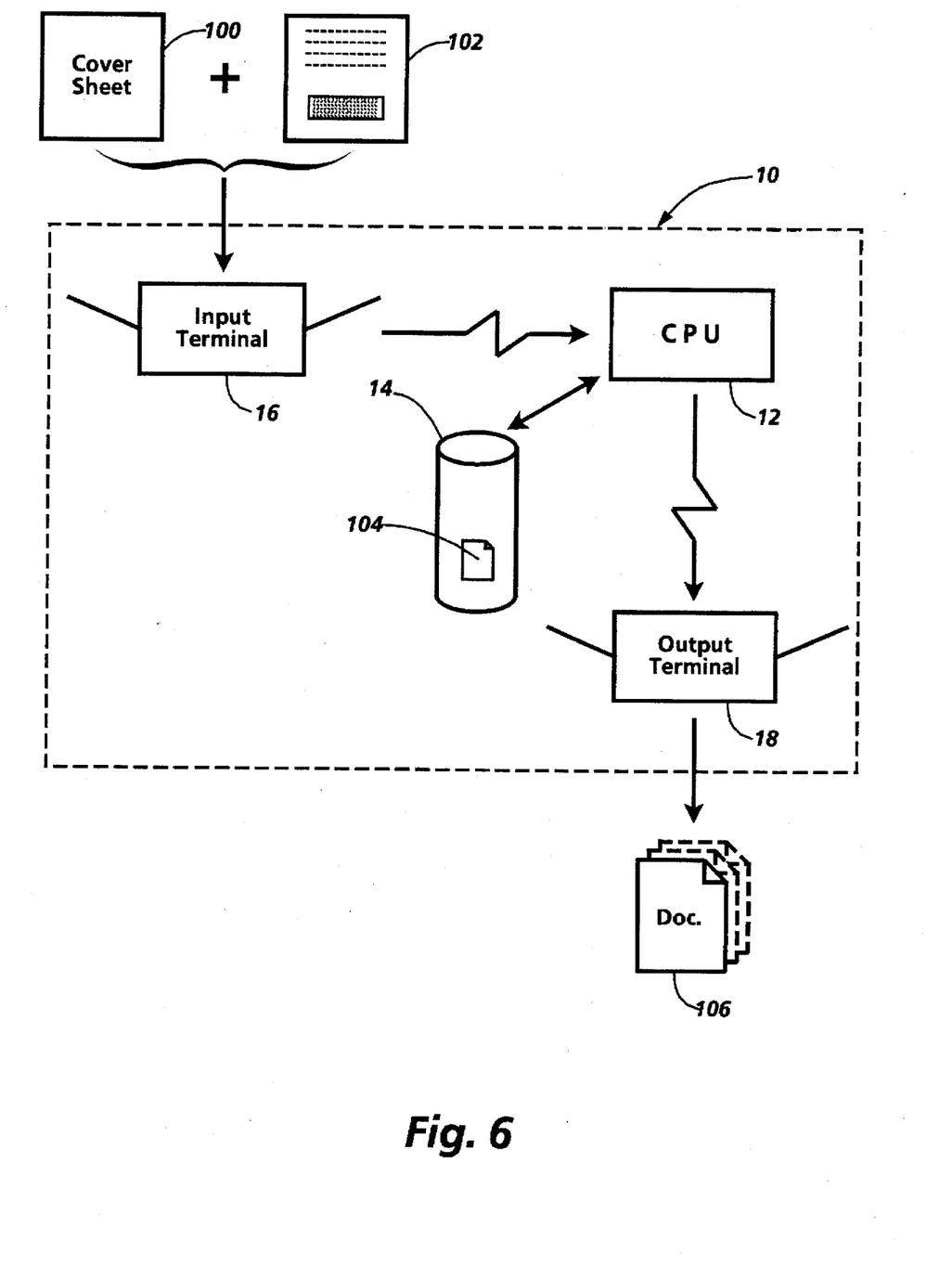
FIG. 6 depicts a way of retrieving an entire document from any page of the document embedded with a document surrogate code.

In a preferred embodiment, the flags denoting that the equivalence is disabled and the flags denoting that the equivalence is enabled are distinguishable. FIG. 6 depicts an exemplary application. Document surrogate 102 is input together with cover sheet 100. Cover sheet 100 specifically instructs system 10 to enable the equivalence between surrogate 102 and its associated object 104 kept in storage 14. With the equivalence thus enabled, system 10 may process associated object 104 and, for example, output document 106 which is a hardcopy version of object 104.

In summary, it will be appreciated that the present invention provides a various ways to provide document summaries that are interpreted as the symbolic equivalent to original stored documents or accessible processes in the document processing system. This equivalency allows a great deal of flexibility in the remote processing of documents. It should be appreciated that the above disclosed methods of using the present invention is not exhaustive and that others skilled in the art may easily devise more.

What is claimed:

1. A method for creating an instance of a hardcopy medium representing an electronic file received by a document processing system, said document processing system having an input device, an output device, a processor for executing document processing functions upon an input object, and a storage area for storing said electronic file, the steps of said method comprising:

(A) receiving an electronic file;
   (B) storing said electronic file in said storage area; and
   (C) outputting at least one piece of hardcopy medium representing said electronic file, said hardcopy medium having thereon a machine readable code, said code comprising an indicator to said electronic file stored in said storage area, a flag which instructs said document processing system to retrieve said electronic file and use instead of said hardcopy medium as an input object for a document processing function and human readable information for indicating the contents of said electronic file.

2. A combination comprising:

a storage area for storing electronic files;
   hardcopy media for representing electronic files stored in said storage area, said hardcopy media bearing marks thereon, said marks including:
   a machine recognizable code comprising an indicator to at least one said associated electronic file, a surrogate flag for indicating that said hardcopy media represents an electronic file and human readable information for indicating the contents of said at least one said associated electronic file;
   a means for inputting images of said hardcopy media;
   a digital processor connected to said storage area and to said means for inputting images, said digital processor for performing selected processing tasks on instances of said hardcopy media images such that said processor determines whether said surrogate flag is present in said hardcopy media image, and, if present, substitutes said at least one said associated electronic file for said hardcopy media image as the object for performing said selected processing task.

3. The combination as recited in claim 2, wherein said at least one said associated electronic file is an associated object accessible to said digital processor.

4. The combination as recited in claim 3 wherein said at least one said associated electronic file is a process accessible to said digital processor.

5. The combination as recited in claim 2 wherein said human readable material contains at least one summary of said at least one said associated electronic file.

6. The combination as recited in claim 5 wherein said summary is user supplied.

7. The combination as recited in claim 5 wherein said summary is automatically generated.

8. The combination as recited in claim 5 wherein said summary is partially user supplied and partially automatically generated.

9. The combination as recited in claim 5 wherein said summary is a reduced image of a page of said at least one said associated electronic file.

10. The combination as recited in claim 5 wherein said summary is a list of keywords.

11. The combination as recited in claim 5 wherein said summary is a list of section headings.

12. The combination as recited in claim 2 wherein said hardcopy media further includes:

at least one selection area corresponding to individual electronic files such that a user may select any subset of said individual electronic files.

13. The combination as recited in claim 2 wherein said hardcopy media further includes:

an override selection area such that a user may instruct said digital processor to select said hardcopy media image instead of said at least one said associated electronic file for further processing.

14. The combination as recited in claim 2 wherein said combination further comprises:

a disable mechanism for instructing the digital processor to select said hardcopy media image instead of said least one said associated electronic file for further processing.

15. A combination comprising:

a storage area for storing electronic files;
   hardcopy media for representing electronic files stored in said storage area, said hardcopy media bearing marks thereon, said marks including:
   a machine recognizable code comprising an indicator to at least one said associated electronic file, a surrogate flag for indicating that said hardcopy media represents an electronic file and human readable information for indicating the contents of said at least one said associated electronic file;
   a means for inputting images of said hardcopy media;
   a digital processor connected to said storage area and to said means for inputting images, said digital processor for performing selected processing tasks on electronic files represented by said hardcopy media images such that said processor determines whether said surrogate flag is present in said hardcopy media image, and, if present, selects said hardcopy media image instead of said at least one said associated electronic file as the object for performing said selected processing task.

16. The combination as recited in claim 15 wherein said at least one said electronic file is a document accessible to said digital processor.

17. The combination as recited in claim 15 wherein said at least one said electronic file is a process accessible to said digital processor.

18. The combination as recited in claim 15 wherein said human readable material contains at least one summary of said at least one said electronic file.

19. The combination as recited in claim 18 wherein said summary is user supplied.

20. The combination as recited in claim 18 wherein said summary is automatically generated.

21. The combination as recited in claim 18 wherein said summary is partially user supplied and partially automatically generated.

22. The combination as recited in claim 18 wherein said summary is a reduced image of a page of said at least one said electronic file.

23. The combination as recited in claim 18 wherein said summary is a list of keywords.

24. The combination as recited in claim 18 wherein said summary is a list of section headings.

25. The combination as recited in claim 15 wherein said hardcopy media further includes:
at least one selection area corresponding to individual electronic files such that a user may select any subset of said individual electronic files for further processing.

26. The combination as recited in claim 15 wherein said hardcopy media further includes:
an override selection area such that a user may instruct said digital processor to select said at least one said electronic file instead of said hardcopy media image for further processing.

27. The combination as recited in claim 15 wherein said combination further comprises:
an enable mechanism for instructing said digital processor to select said at least one said electronic file instead of said hardcopy media image for further processing.

28. The combination as recited in claim 18 wherein said summary is a page of said at least one said electronic file.

29. A document processing system comprising:
a storage means for storing a plurality of electronic files;
a source medium for representing electronic files stored in said storage area, said source medium capable of having a first indicator indicating that said source medium has a second indicator, said second indicator indicating one of said plurality of electronic files, said source medium further capable of having human readable information for indicating the contents of said one of said plurality of electronic files;
an input means for receiving a representation of a source medium;
a function selection means for indicating a document processing function to be performed on one of said plurality of electronic files;
a processing means coupled to said input means, said storage means, and said function selection means, said processing means comprised of:
a plurality of document processing function means each for performing a corresponding document processing function on said source medium;
means for identifying an instance of said first indicator on said representation of said source medium;
means for identifying one of said plurality of electronic files corresponding to an instance of said second indicator on said representation of said source medium; and
means for substituting said identified one of said plurality of electronic flies for said source medium for processing by said document processing function; and
an output means coupled to said processing means, said output means for providing an output of a document processing function.

30. The document processing system as recited in claim 29 wherein said processing means is further comprised of means for creating an instance of a source medium having said first indicator and said second indicator for output on said output means.

31. The document processing system as recited in claim 29 wherein said input device is a scanner.

32. The document processing system as recited in claim 29 wherein said output means is coupled to a communications line.

33. The document processing system as recited in claim 32 wherein an associated one of said one or more document processing functions is a distribution by facsimile transmission.

34. The document processing system as recited in claim 32 wherein an associated one of said one or more document processing functions is a distribution by electronic mail.

35. The document processing system as recited in claim 29 wherein said output means is a printer device and one of said one or more document processing functions is a print function.

36. The document processing system as recited in claim 29 wherein said function selection means is comprised of is a predefined check-box control sheet defining a plurality of document processing functions and means for identifying from said control sheet the document processing function selected.

37. A method for specifying documents stored in a document processing system as the object of a document processing function, said method comprising the steps of:
a) generating an electronic representation of a document for storing in said document processing system;
b) storing said electronic representation in said document processing system;
c) generating a form for accessing said stored electronic document, said form having thereon machine readable information comprised of a flag for indicating said form represents a stored electronic document, and file identifier information for accessing said stored electronic document, said form further comprising human readable information for indicating the contents of the stored electronic document that said form represents;
d) requesting a first document processing function to said document processing system;
e) inputting said form as the object of said first document processing function;
f) said document processing system detecting that said form represents said stored electronic file;
g) said document processing system retrieving said electronic filed represented by said form based on said file identifier information; and
h) said document processing system performing said first document processing function on said retrieved electronic file.

38. The method as recited in claim 37 wherein said step of inputting said form as the object of said first document processing function is further comprised of the steps of:
e1) scanning said form to create a bitmap representation of said form; and
e2) providing said bitmap representation to said document management system as input.

39. The method as recited in claim 38 wherein said step of said document processing system determining that said form represents said stored electronic file is further comprised of the step of detecting that said bitmap representation of said form contains said flag for indicating said form represents a stored electronic document.

40. The method as recited in claim 39 further comprising the steps of:

i) said document processing system detecting that said bitmap representation of said form does not contain said flag for indicating said form represents a stored electronic document; and j) said document processing system performing said first document processing function on said bitmap representation of said form.

* * * * *